April 7, 1964     G. L. WALLIS     3,128,015
APPARATUS FOR DISTRIBUTING OR DISPENSING
POWDERED OR GRANULAR MATERIAL Filed Oct. 23, 1961     4 Sheets-Sheet 1

INVENTOR
GEORGE L. WALLIS
BY
ATTORNEY

April 7, 1964  G. L. WALLIS  3,128,015
APPARATUS FOR DISTRIBUTING OR DISPENSING
POWDERED OR GRANULAR MATERIAL
Filed Oct. 23, 1961  4 Sheets-Sheet 2
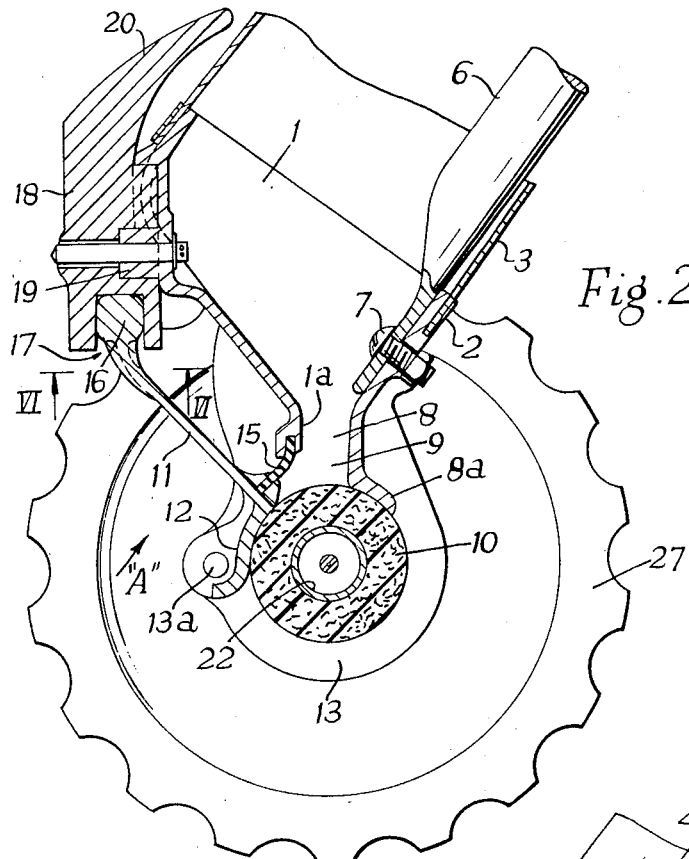
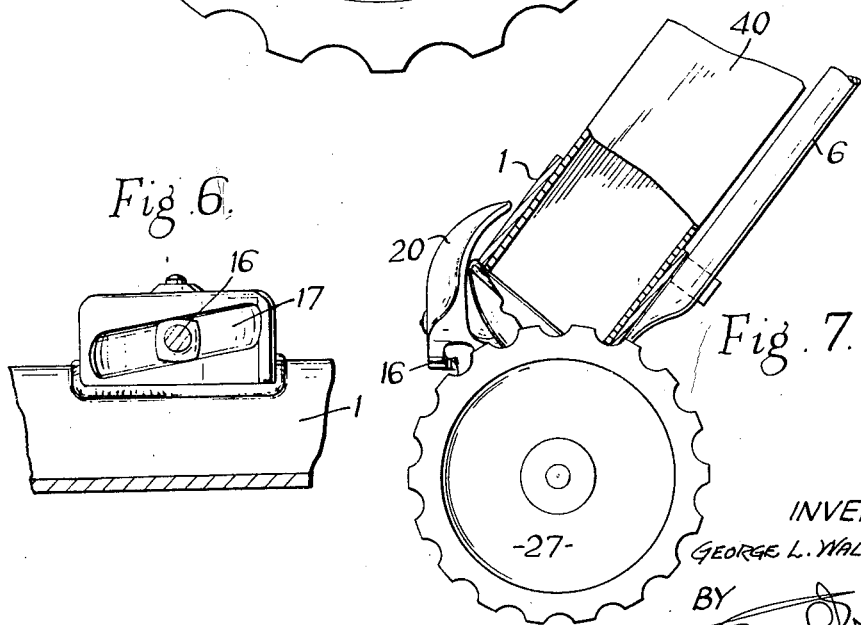
INVENTOR
GEORGE L. WALLIS
BY
ATTORNEY April 7, 1964 G. L. WALLIS 3,128,015
APPARATUS FOR DISTRIBUTING OR DISPENSING
POWDERED OR GRANULAR MATERIAL
Filed Oct. 23, 1961 4 Sheets-Sheet 3
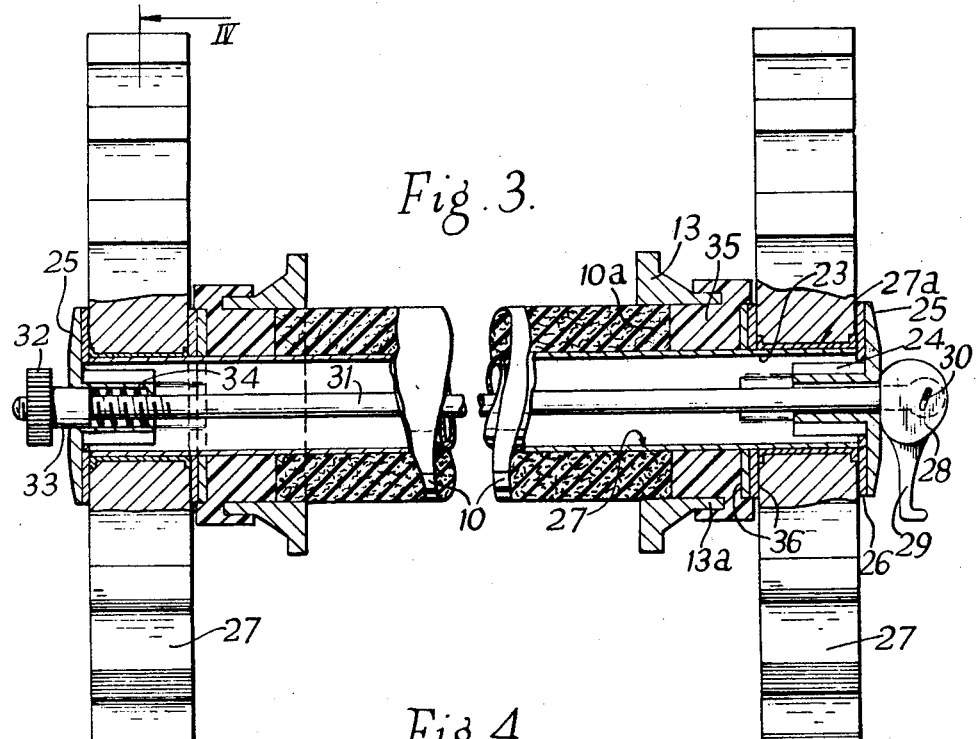
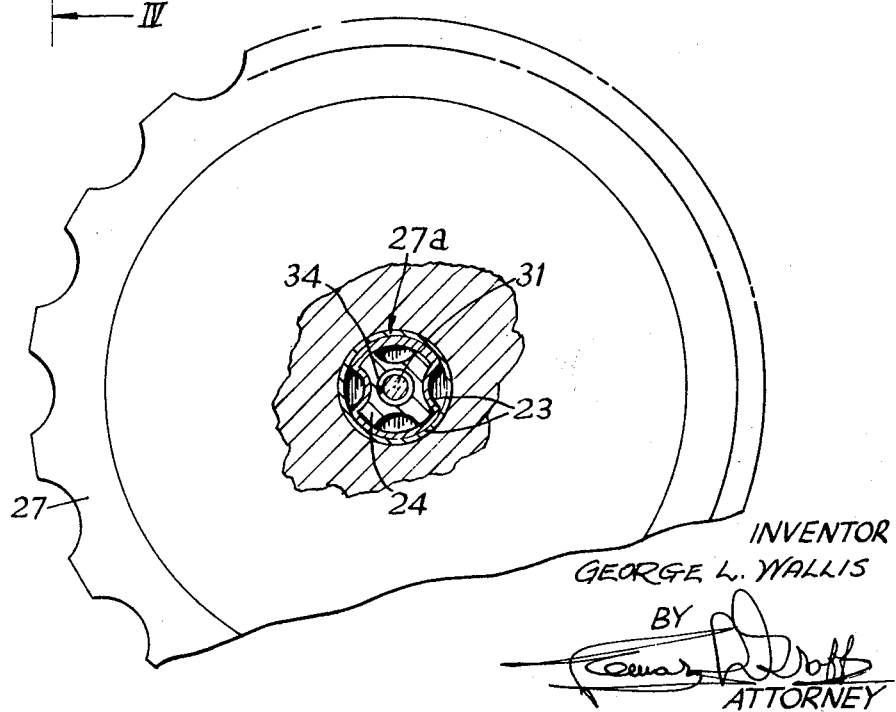
INVENTOR
GEORGE L. WALLIS
BY
ATTORNEY

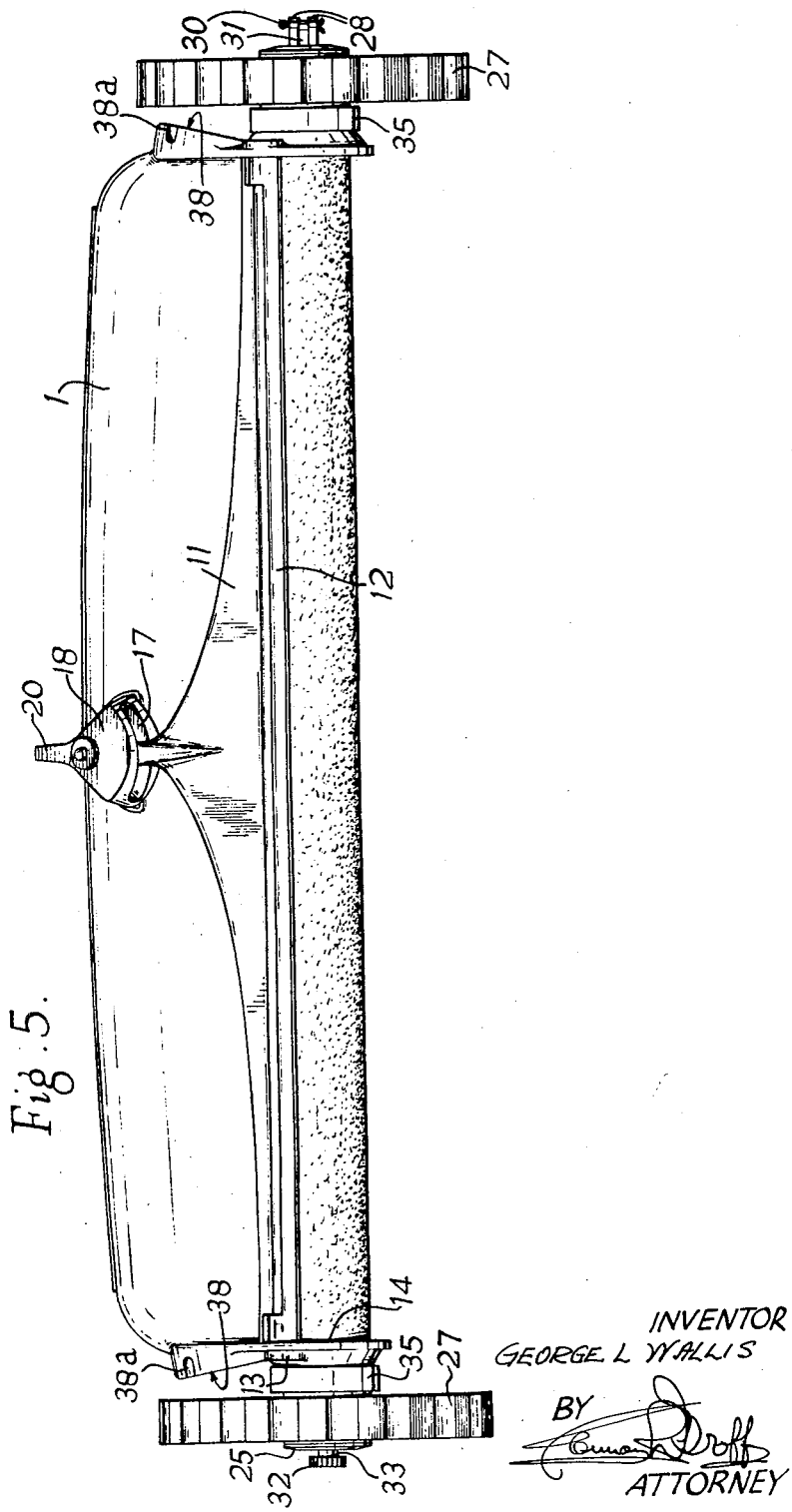

United States Patent Office 3,128,015
Patented Apr. 7, 1964

3,128,015
APPARATUS FOR DISTRIBUTING OR DISPENSING POWDERED OR GRANULAR MATERIAL
George Leslie Wallis, 74 Lenelby Road, Tolworth, Surbiton, England
Filed Oct. 23, 1961, Ser. No. 146,692
5 Claims. (Cl. 222—177)

The present invention relates to apparatus for distributing or dispensing a powdered or granular material. The apparatus of this invention may be utilized for a multiplicity of different purposes but is more particularly, although not exclusively, intended for (a) distributing granular fertilizer on the ground and (b) distributing a powdered detergent on a floor or other surface to be cleaned prior to cleaning the latter with a moist cloth or the equivalent.

The primary object of the invention is the provision of an apparatus which is simple and easy to make and which will function to distribute or dispense, with great accuracy, a predetermined quantity of the material over a predetermined area.

According to the present invention there is provided apparatus for the purpose referred to which comprises a distributing roller having a soft resilient surface or covering and a shallow elongated trough-like part having a restricted outlet forming a choke through which material can pass into an enlarged material-release chamber having an elongated opening at its lower end closed by the surface of the distributing roller, and a rigid adjustable smoothing member associated with said roller which coacts with the surface of the latter and regulates or meters the amount of material carried around and discharged by the distribtuing roller.

The adjustable control means for regulating or metering the quantity of material discharged per unit area comprises a hinged flap or plate having a roller-contacting face of curved cross section which is adjustable relatively to the surface of the roller by imparting a hinging movement to said flap in any suitable manner but conveniently by a turnable member mounted on the front wall of said trough-like part and which has a cam groove in which is received a pin-like projection on the free edge of said flap.

In use, the roller is caused to rotate and its surface picks up the material in the enlarged material release chamber and carries it round and releases it as it passes across the elongated opening, the curvature of the hinged flap acting to "wipe" and smooth the roller so that the material is distributed in an even manner.

To enable the invention to be clearly understood a preferred embodiment thereof will now be described by way of example with reference to the accompanying drawings, wherein:

FIGURE 2 is a vertical transverse section, drawn to a larger scale, and taken through the elongated trough-like part and the distributing roller.

FIGURE 3 is a longitudinal section taken through the distributing roller.

FIGURE 4 is a view taken on the line IV—IV of FIGURE 3.

FIGURE 5 shows the front of the trough-like part in elevation looking in the direction of the arrow "A" in FIGURE 2.

FIGURE 6 is a detail view taken on the line VI—VI of FIGURE 2, and

FIGURE 7 is a detail view showing how the trough-like part may be adapted to receive a carton of material instead of being fitted with a hopper.

Figure 1:
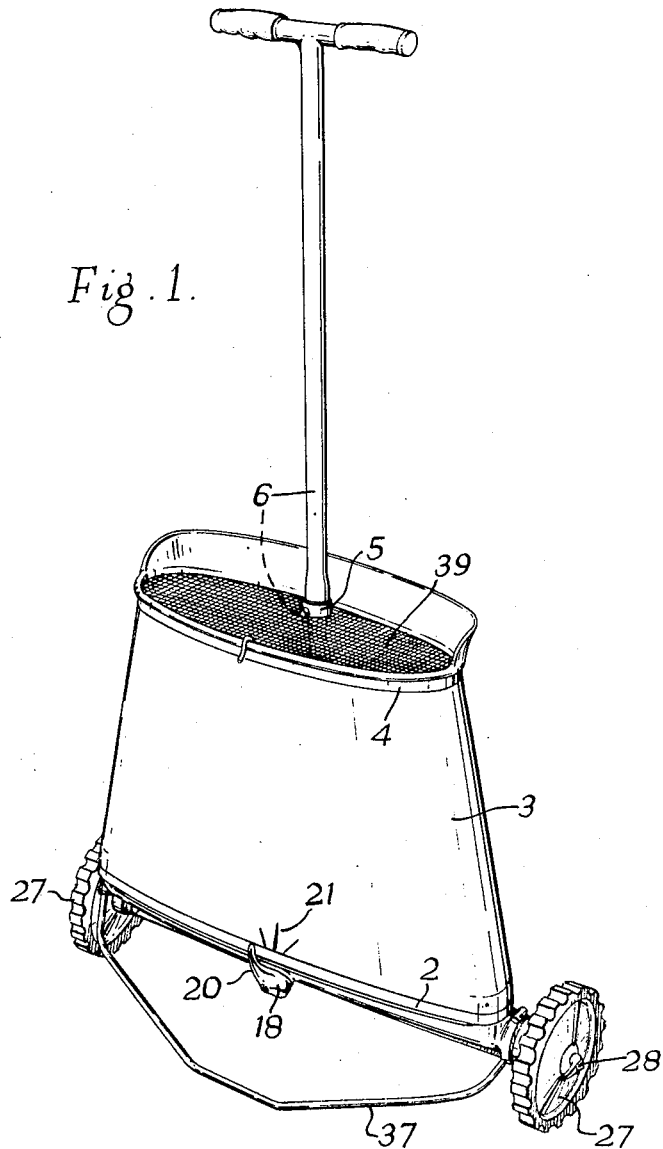
FIGURE 1 is a front perspective view of the apparatus.

Referring to the drawings, the apparatus comprises an elongated material supporting and dispensing trough part 1 about the upper edge of which is clamped, by a contractible metal band 2, the lower open end of a hopper 3 for receiving a supply of the material to be distributed and from which the material can gravitate into said trough-like part 1. This hopper 3 is made of a cheap material such as self-sustaining sheet P.V.C., cardboard or stout reinforced paper.

This hopper 3, as shown in FIGURE 1, is of approximately elongated oval cross section and increases in width from the open top thereof to the lower edge which is clamped to the upper edge of the elongated trough-like part 1. The upper edge of this hopper is fitted with a plastic rim 4 having, at the rear edge of the hopper, a lug 5 formed with a hole through which can pass the lower part of a two-piece handle 6 which is secured at its lower end as indicated at 7 (FIGURE 2) against the inner face of the rear wall of the discharge chamber 1. Thus, this plastic rim 4 serves a dual purpose in that it strengthens and holds rigid the upper edge of the hopper 3 and also serves as a guide and support for the lower part of the handle 6 and thereby prevents the latter swinging about its lower end where it is connected at 7 to the rear wall of the discharge chamber or dispensing trough 1.

The said elongated trough 1 comprises a metal casting including downwardly inclined converging front and rear walls 1a and 1b which support the major portion of the load or weight of the granular material and which falls by gravity between the spaced parallel vertical walls 1c and 1d whose inner faces are spaced equidistantly from a vertical plane intersecting the axis of the axle assembly. These walls form a restricted elongated passage or choke opening 8 through which the material can pass under even load distribution into a material release chamber 9. This chamber is enlarged at its mouth due to the fact that the front wall 1c of the choke or throat 8 is shorter than its complementary wall 1d and the curvature of the sealing strip 15 and the arcuate smoothing member 11—13. Also, this chamber 9 is closed at its lower end by an arc of the peripheral surface of a distributing roller 10 made of soft resilient material such as, for example, aerated rubber, polyurethane or the like. The said choke 8 acts to restrict and control the flow of material passing to the release chamber 9 and its size, in relation to the size of the mouth of the trough-like part, is such that a required flow of a range of granular or powdered materials is obtained. The lower rear edge of the rear wall 1b is curved at 8a so as to be complementary to the curvature of the roller 10.

The quantity of material carried around by the surface of the roller 10 and distributed evenly over a unit of area is controlled by a rigid adjustable smoothing plate-like member 11 fitted to the front of the trough-like part 1 so as to have its lower part 12 which is curved complementary to the curvature of the roller 10, positioned adjacent to the surface of the roller so that by adjusting said member 11, and therefore the position of said curved part 12 relatively to the surface of the roller as indicated in dotted outline, the amount of material carried around and discharged by the distributing roller 10 can be controlled and the amount of material distributed accordingly regulated or metered. As the roller 10 rotates it is slightly compressed as it passes beneath the parts 12 and 8a defining the mouth of the release chamber so that the material carried around and released by the roller is smoothed and accurately dispensed.

The quantity of material distributed per unit area can, with great accuracy, be calculated by the choice of the rubber covering for the roller 10. Thus, a fairly soft rubber having a large cellular structure will permit the distribution of a larger quantity of material per unit area then would a roller covered with a more dense cellular structure.

Preferably, the rubber is of the type having sealed cavities, i.e. wherein cavities around the outer skin are not in communication with cavities within the body of the rubber.

The ends of the curved part 12 of the adjustable smoothing plate-like member 11 are hinged on pins 13a in bosses 13 in depending side cheeks 14 at each end of the front of the trough-like part in such a manner that the top edge of the curved part 12 can be swung away from or towards the front of the roller 10. Actually, the swinging movement of this metering flap 11, 12 is so very slight as to be almost imperceptible. Even if the plate is moved a matter of .010" a considerable difference results in the delivery of the material on to the ground. The swinging of said plate 11 results in its lower curved part 12, which co-acts with the surface of the roller 10, being rocked very slightly indeed but sufficiently to permit a greater or lesser quantity of material being discharged by the roller 10.

From the foregoing it will be appreciated that the arrangement comprises a roller 10 having a soft resilient surface with which co-acts the curved part 12 of a rigid smoothing member 11 so that irregularities in the material are accepted by the yielding of the roller surface.

The upper edge of the curved part 12 which is directed towards the roller 10 is grooved and fitted with one edge of a strip of rubber or equivalent material 15 having its other edge located in a groove in the lower edge of the front vertical wall 1d of the trough-like part 1, the said edge being spaced from the roller 10 and the rubber strip 15 serving purely as a sealing strip.

The plate 11 is upwardly directed and terminates in a ball or pin-like part 16 which engages in a cam shaped groove 17 formed in a turnable member 18 mounted to rotate on a boss or stud 19 provided on the front wall of the trough-like part 1, the groove 17 acting to swing the pin-like projection 16 and therefore said flap about its pivot pins 13a. This turnable member 18 is formed with a pointer 20 which can be moved against markings 21 on the front face of the hopper 3 indicating the position to which the turnable member 18 should be moved when distributing different kinds of granular or powdered material.

The distributing roller 10 comprises a tube 22 upon which is fitted a sleeve or aerated rubber, polyurethane or similar soft resilient material and the ends 23 of this tube 22 are fluted or made hexagonal or otherwise suitably fashioned for the reception of correspondingly shaped driving elements 24 which engage in each of the fluted ends of the tube. The outer ends of the driving elements 24 are formed with flanges 25 provided on their inner faces with friction discs 26 which are adapted to be urged against the centre parts of the outer faces of ground wheels 27 whereby the driving elements are made fast with the wheels 27 so that the drive from the latter, as the machine is being wheeled over the ground, is transmitted to the fluted ends of the tube 22 and the roller 10 so caused to rotate. Each wheel 27 is fitted with a sleeve bearing 27a in which the fluted ends 23 of the tube 22 can rotate.

The means for urging the friction discs 26 against the side faces of the ground wheels 27 comprises a cam 28 formed with a finger piece 29 and this cam 28 is eccentrically pivoted at 30 to one end of a rod 31 passing completely through the roller tube 22 and this rod 31 is screw-threaded at its other end to receive a nut 32 formed with a hollow shank 33 which enters a bore in the driving element 24 at this end of the roller and compresses therein a small spring 34. The arrangement is such that with the spring compressed a required amount the rod 31 moves slightly axially in one direction by releasing the cam 28 and the friction discs 26 can slip with respect to the faces of the ground wheels 27 so that the driving elements are "declutched" and do not drive the roller 10. This condition is desirable when it is required to wheel the machine along the ground without distributing, e.g. when wheeling the machine with a filled hopper from a shed to a lawn. When distributing is required the cam is swung into an operative position in which the rod in the friction discs are urged against the side of the ground wheels to provide a positive drive from the latter to the roller 10. A further advantage of this drive arrangement is that the spring loading 34 provides for a "differential" action and permits the necessary slip to allow one ground wheel to turn more quickly than the other when the machine is being turned.

The ends 10a of the rubber covered roller 10 fit into apertures in the bosses 13 on the depending side cheeks at each end of the discharge chamber 1 and these bosses are formed with circumferential flanges 13a over which engage grooved nylon bushes 35 constituting seals which prevent leakage of the material from the ends of the roller 10 through the annular bosses 13. The inner diameter of each of these bushes 35 is provided with diametrically opposed nibs or tongues (not visible in the drawings) which engage in the flutes in the ends of the tube 22 so that they also constitute bearing members which rotate in the bosses 13 and, to supplement the drive through the friction discs 26, the opposed inner faces of the ground wheels 27 and the outer ends of the bushes 35 being fitted with friction discs 36.

To enable the apparatus to be left standing in an upright position of rest it is fitted with a foot or stand 37 (FIGURE 1) made of springy rod material or stout springy wire bent to shallow U form. The ends of the U are inturned and snap into the holes in bosses provided in the depending side wings of the discharge chamber 1 and the side wings or end walls of the chamber 1 are formed with cam edges 38 (FIGURE 5) having recesses 38a into which the side limbs of the U can snap when the foot is swung downwardly around the end walls of the discharge chamber from an inoperative position in which it lies against the front wall of the hopper (to facilitate packing and transport when sold) to a position of use in which it permanently combines with the ground wheels to retain the apparatus in a stable upright position. The cam edges 38 cause the U to open slightly so that the limbs of the U snap into said recesses 38a when they register with the latter.

To enable the apparatus to be caused to assume a compact form for transport when sent from the factory or shops to purchasers the handle 6 is made in two pieces comprising the lower part already referred to which is secured at its lower end to the rear wall of the discharge chamber and which passes through the lug of the plastic rim 4 fitted to the top edge of the hopper 3 and a second part which is a tight friction fit over the upper end of the first mentioned and lower part.

In certain uses of the apparatus of this invention, it may be found convenient to dispense directly from a container or carton in which the material to be dispensed is sold. For this reason the apparatus may be modified slightly, as illustrated by FIGURE 7, by omitting the hopper 3 and shaping the upper part of the trough-like part 1 as shown so as to make it a little deeper so that it will accept as a snug fit an opened lower end of a carton 40 placed therein. If desired, the handle may be fitted with a slidable plate adapted to rest on top of a carton and hold it in position. When replacing a carton the plate is slid up, the used carton removed, a new one placed in position and the plate lowered on to the upper end of the new carton. When the trough-like part is designed to accept a carton in place of a hopper, then the shape of the upper part of the trough is made so as to be complementary to the cross-sectional shape of the carton to be used therewith.

As a precautionary measure, the upper open end of the hopper 3 may be fitted with a removable grid or screen 39 (FIGURE 1) acting as a sieve which prevents foreign matter entering the hopper. Thus, should a person spill the granular material on to the ground when filling the hopper 3 and shovel it from the ground into the hopper, the screen 39 will stop stones from passing into the hopper and damaging the distributing roller.

Although it is preferred to use a distributing roller 10 having a surface of a soft resilient material such as rubber, any other suitable form of roller may be used, e.g. a roller formed both longitudinally and circumferentially with a multiplicity of pockets.

An important feature of the rubber seal which is fitted between the lower front edge of the material-discharge chamber and the adjustable member 12 is that this seal automatically adapts itself to conform with the required shape of the material-release chamber.

The apparatus of this invention may be manually propelled; incorporate its own power unit, or in the case of large models, e.g., about 10 feet wide, can be hitched to and pulled along behind a tractor and if necessary driven by the power take off shaft of the tractor.

Although the apparatus is primarily intended for distributing fertilizer, it is to be appreciated that it may be used for analogous purposes in industry. For example, the apparatus may be mounted or supported in a stationary manner and used for treating cloth and other materials by distributing thereon a granular or powdered material for processing cloth or the like.

What I claim is:

1. An apparatus for effecting controlled spreading of dry granular materials of relatively minute size range over a receiving surface, comprising, in combination, an axle assembly 22–34,
   wheels 27 for supporting and turning said assembly,
   a material distributing roller 10 having a soft rubber surface provided with a cellular periphery and mounted on said axle assembly for rotation therewith,
   a laterally elongated dispensing trough 1 also mounted on said axle assembly above said roller 10 and having an enlarged upper portion communicating with a feed hopper 3, said trough including downwardly converging front 1a and rear 1b material supporting and shedding bottom walls terminating in spaced apart parallel guide walls 1c, 1d to receive and direct material onto the arcuate surface of the roller within the limits defined by the vertical planes of the inner surfaces of said parallel walls, said planes being spaced equidistantly from a vertical plane intersecting the axis of the axle assembly,
   said rear wall 1b having a rearwardly extending curved bottom edge 8a conforming to and in contact with the leading peripheral portion of the roller,
   a flexible sealing strip 15 depending from the lower edge of the front inclined wall 1a at the discharge side of the roller,
   and material escape regulating means 11–18 carried by the front wall 1a and the axle assembly 22–34 and having a curved surface 12 conforming to and movable toward and from the periphery of the roller at the discharge side thereof to permit a selected regulated quantity of material to drop onto the receiving surface.

2. An apparatus for effecting controlled spreading of dry granular materials of relatively minute size range over a receiving surface, comprising, in combination, an axle assembly 22–34,
   wheels 27 for supporting and turning said assembly,
   a material distributing roller 10 with a soft rubber surface provided with a cellular periphery and mounted on said axle assembly for rotation therewith,
   a dispensing trough 1 also mounted on said axle assembly above said roller 10 and having an enlarged upper portion communicating with a feed hopper 3,
   downwardly inclined converging front 1a and rear 1b material supporting and shedding bottom walls terminating in said trough,
   spaced apart parallel guide wall portions 1c, 1d depending from said front and rear walls and the front wall being shorter than the rear wall to receive and guide material onto the arcuate surface of the roller within the limits defined by the vertical planes of the inner surfaces of said parallel walls,
   said rear wall 1b having a curved bottom edge 8a extending rearwardly and in contact with the periphery of the roller,
   a flexible sealing strip 15 depending from the lower edge of the front inclined wall 1a at the discharge side of the roller, said strip and front and rear parallel walls together forming a release chamber 9 havan enlarged mouth overlying the periphery of the roller,
   and material escape regulating means 11–18 carried by the front wall 1a and the axle assembly 22–34 and having a curved surface 12 movable toward and from the periphery of the roller at the discharge side thereof.

3. Apparatus for distributing powdered or granular material, comprising, in combination, a wheeled axle assembly 22–34,
   a hopper 3,
   a dispensing trough for said hopper and mounted on said axle assembly and having inclined diverging bottom walls (1a+1b) terminating in spaced parallel vertical walls forming a restricted outlet,
   a distributing roller 10 having a covering of soft resilient material in closing and wiping contact with said opening,
   a hinged material smoothing member 12 having a curved metering face co-acting with the surface of the roller for controlling the amount of material discharged thereby,
   a turnable feed regulating member 20 mounted on the outer front side wall 1a of the hopper and having a cam slot 17 engaging with a portion of the smoothing member 12 for swinging said smoothing member relative to the surface of the roller to adjust its curved face relative to the surface of the roller and permit a greater or lesser amount of material to be discharged by the roller,
   a tube 22 forming an internal part of said roller,
   driving elements 24 in the ends of said tube,
   flanges 25 on said driving elements having friction faces in engagement with the side faces of the wheels of the axle assembly,
   and means for engaging and disengaging said friction faces with the ground wheels for transmitting and interrupting the drive to the roller 10.

4. Apparatus for distributing powdered or granular material, comprising, in combination, an axle assembly 22–34,
   ground wheels 27 on said axle assembly,
   a hopper 3,
   a dispensing trough 1 for said hopper and mounted on ground wheels 27, said trough including inclined converging walls (1a+1b) terminating in spaced parallel walls (1c+1d) forming a restricted material outlet,
   a hollow distributing roller 10 having a surface of soft resilient material closing said outlet,
   a material smoothing member 12 hinged 13a to an annular boss 13 on the axle assembly and having a curved material metering portion co-acting with the surface of the roller for controlling the amount of material carried thereby from the outlet,
   a turnable member (18+20) mounted on the front wall 1a of the trough and having a cam slot 17 engaging with a related portion of the smoothing member 12 for swinging said member to adjust its curved portion relatively to the roller to permit a greater or lesser amount of material to be discharged by the roller,
   driving elements 24 in the ends of said hollow roller 10, flanges 25 on said driving elements having friction faces 36 in engagement with the side faces of the ground wheels 27,
a rod 31 extending through the hollow roller and said driving elements,
and a spring-loaded abutment 34 at one end of said rod 31 and a cam 28 pivotally secured to the other end of the rod and engaging the flanges 25 of the driving element at the related end of the roller, the cam acting to displace the rod 31 axially to cause the friction faces of the flanges to be engaged with or disengaged from the ground wheels for transmitting and interrupting the drive to the roller.

5. Apparatus for distributing powdered or granular material according to claim 4, wherein, the annular bosses 13 have internal bores receiving the opposite ends of the roller 10 and also have flanges receiving bushings 35 of nylon which abut the end walls of the soft cover of the roller 10 and serve as a material seal to protect the said friction surfaces 36 and the flanges 25 on the driving elements 24.

References Cited in the file of this patent
UNITED STATES PATENTS

| | | |
|---|---|---|
| 735,862 | Dundon | Aug. 11, 1903 |
| 2,141,512 | Carr | Dec. 27, 1938 |
| 2,243,233 | Volk | May 27, 1941 |
| 2,737,319 | Rayburn | Mar. 6, 1956 |
| 2,865,536 | Price | Dec. 23, 1958 |